(12) United States Patent
Cho et al.

(10) Patent No.: US 12,541,089 B2
(45) Date of Patent: Feb. 3, 2026

(54) PATTERN ELECTRODE STRUCTURE FOR ELECTRO-WETTING DEVICE

(71) Applicants: Hyundai Motor Company, Seoul (KR); Kia Corporation, Seoul (KR)

(72) Inventors: Byung-Kyu Cho, Seoul (KR); Jai-Min Han, Suwon-si (KR); Kwang-Joon Han, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 932 days.

(21) Appl. No.: 17/747,641

(22) Filed: May 18, 2022

(65) Prior Publication Data

US 2023/0176359 A1   Jun. 8, 2023

(30) Foreign Application Priority Data

Dec. 2, 2021   (KR) .......................... 10-2021-0171058

(51) Int. Cl.
  *G02B 26/00*   (2006.01)
  *G02B 3/14*   (2006.01)

(52) U.S. Cl.
  CPC .............. *G02B 26/005* (2013.01); *G02B 3/14* (2013.01); *G02B 2207/115* (2013.01)

(58) Field of Classification Search
  CPC .. G02B 26/005; G02B 3/14; G02B 2207/115; G02B 27/0006; B08B 7/02
  See application file for complete search history.

(56) References Cited

U.S. PATENT DOCUMENTS

| | | |
|---|---|---|
| 2004/0211659 A1 | 10/2004 | Velev |
| 2013/0101753 A1 | 4/2013 | Eral et al. |
| 2018/0113297 A1 | 4/2018 | Desai et al. |
| 2019/0235335 A1* | 8/2019 | Lee ...................... G02F 1/1368 |

FOREIGN PATENT DOCUMENTS

| | | |
|---|---|---|
| JP | 6802709 B2 | 12/2020 |
| KR | 10-2010-0035691 A | 4/2010 |
| KR | 10-1805300 B1 | 1/2018 |
| KR | 10-2018-0045079 A | 5/2018 |
| KR | 10-2010634 B1 | 8/2019 |
| KR | 10-2102653 B1 | 4/2020 |
| KR | 10-2152647 B1 | 9/2020 |
| KR | 10-2021-0057899 A | 5/2021 |
| WO | 2015/164847 A1 | 10/2015 |

* cited by examiner

*Primary Examiner* — James C. Jones
(74) *Attorney, Agent, or Firm* — Morgan, Lewis & Bockius LLP

(57) ABSTRACT

A pattern electrode structure stacked between a base material and a dielectric layer of an electro-wetting device includes a center branch electrode extending in a first direction, and a plurality of sub-branch electrodes extending from the center branch electrode in an inclined direction relative to the first direction. According to the present disclosure, self-cleaning performance can be more efficiently exhibited even for small droplets.

12 Claims, 12 Drawing Sheets

[FIG. 1]
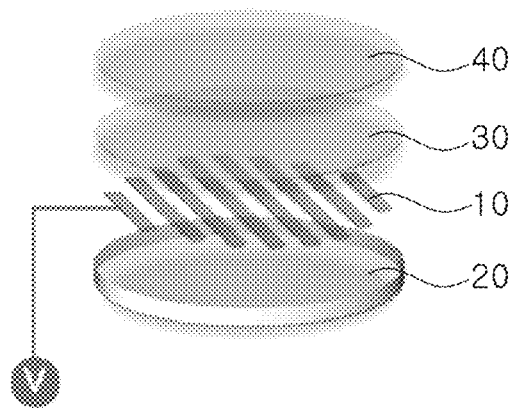
[FIG. 2]
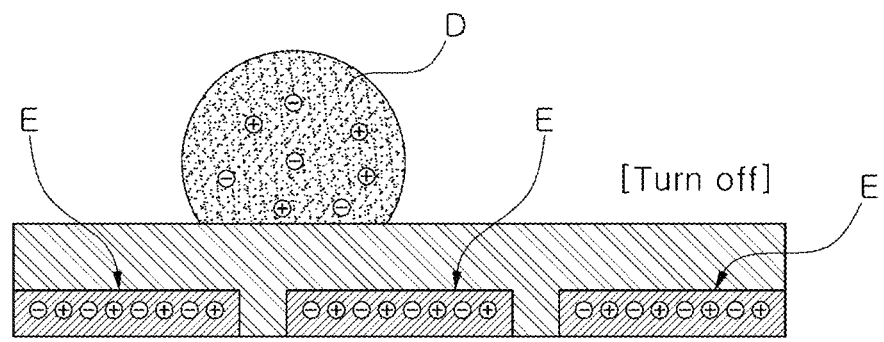
[FIG. 3]
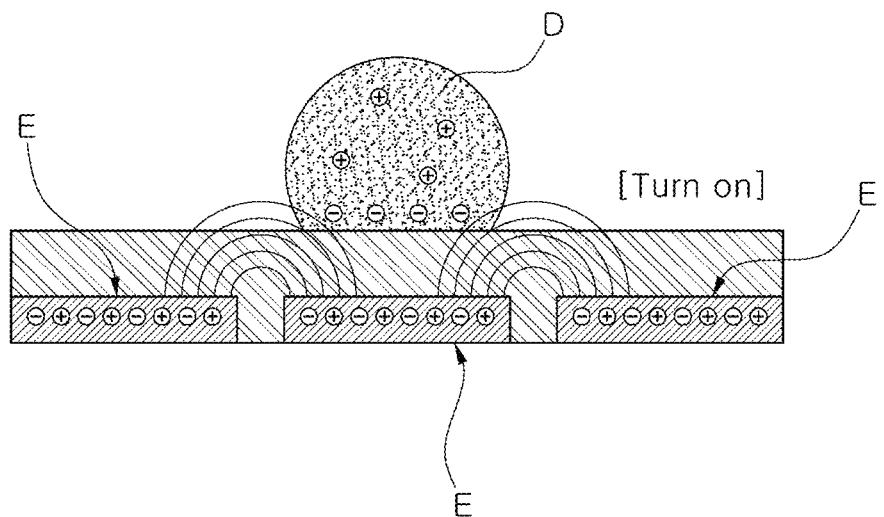

[FIG. 4]
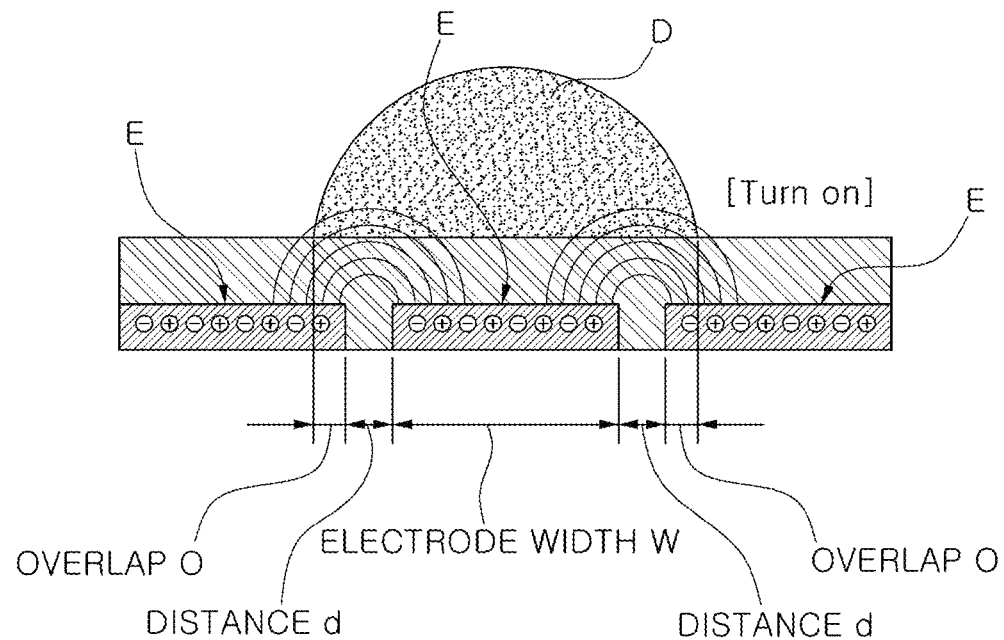
OVERLAP O — DISTANCE d — ELECTRODE WIDTH W — OVERLAP O — DISTANCE d
[FIG. 5]
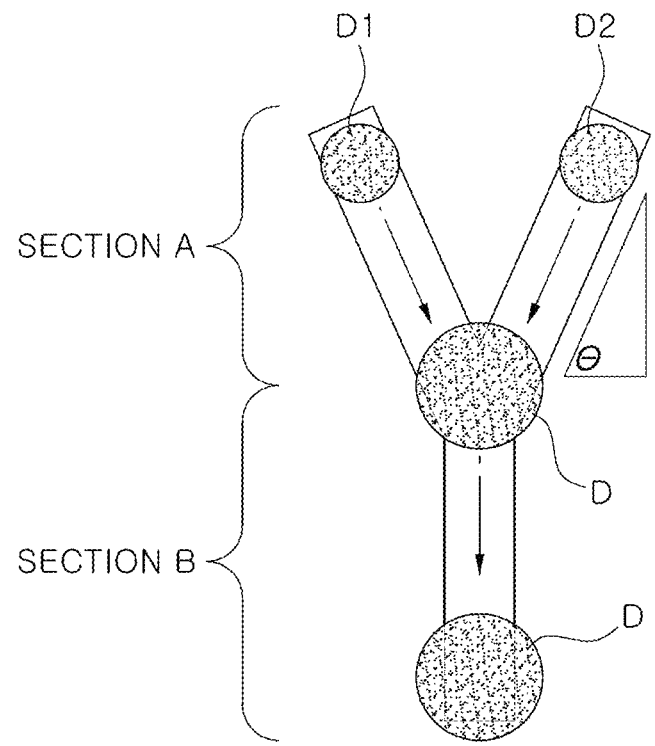
SECTION A
SECTION B

[FIG. 6]
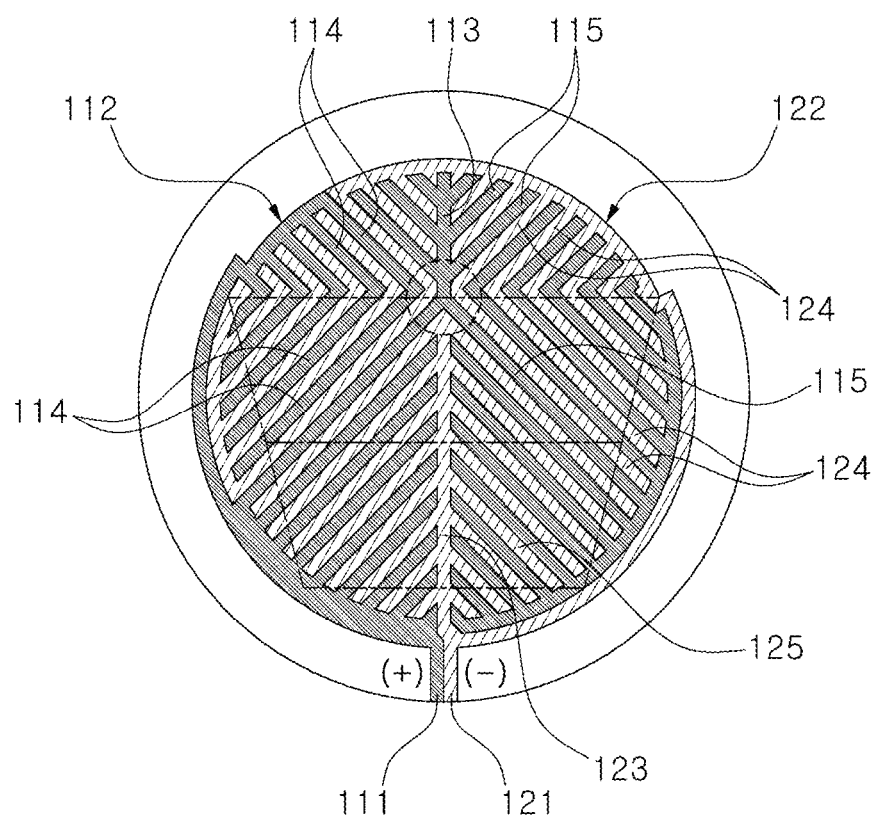

[FIG. 7]
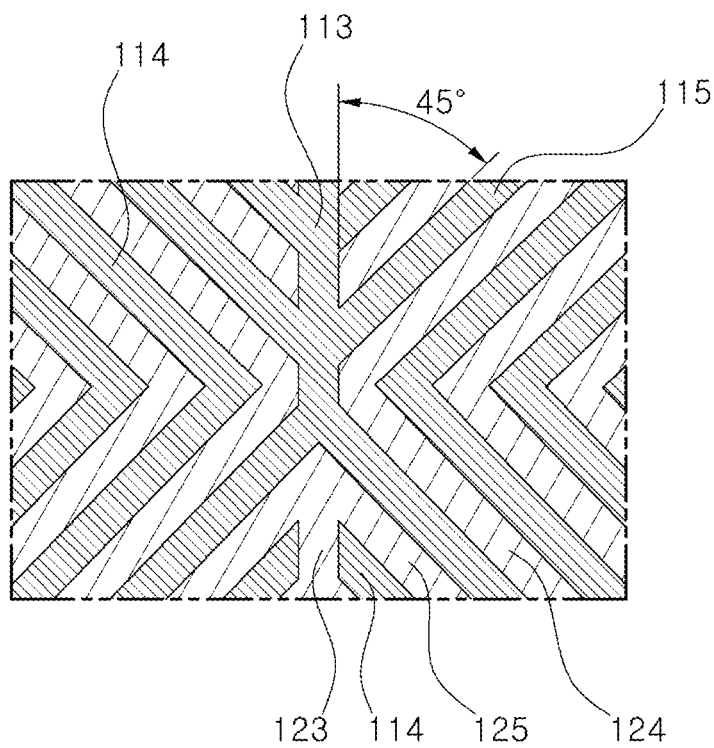

[FIG. 8]
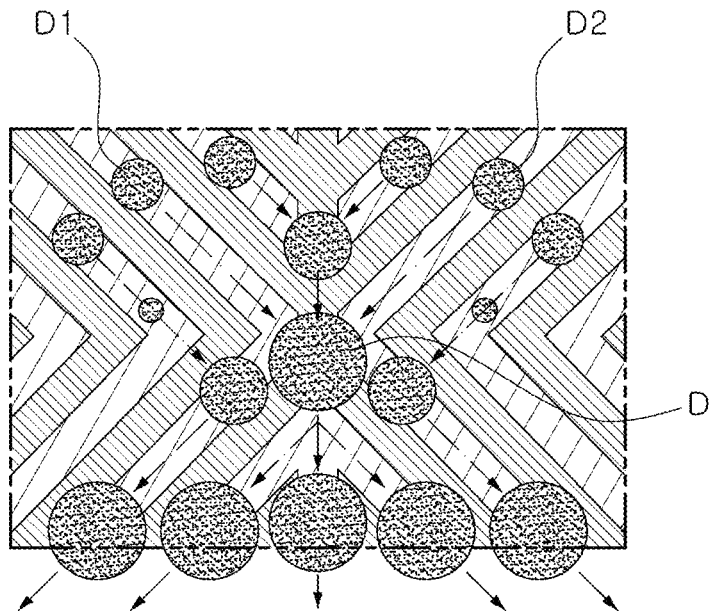
[FIG. 9]
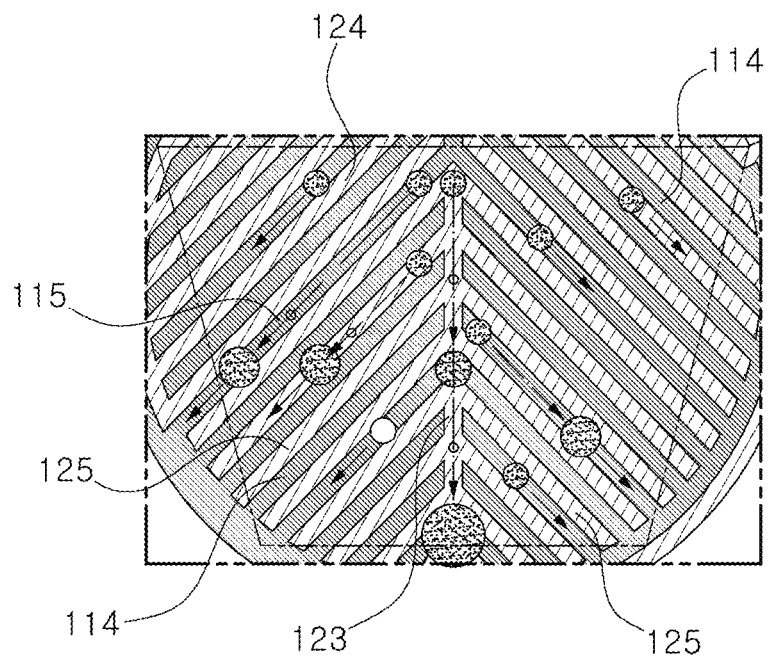

[FIG. 10]
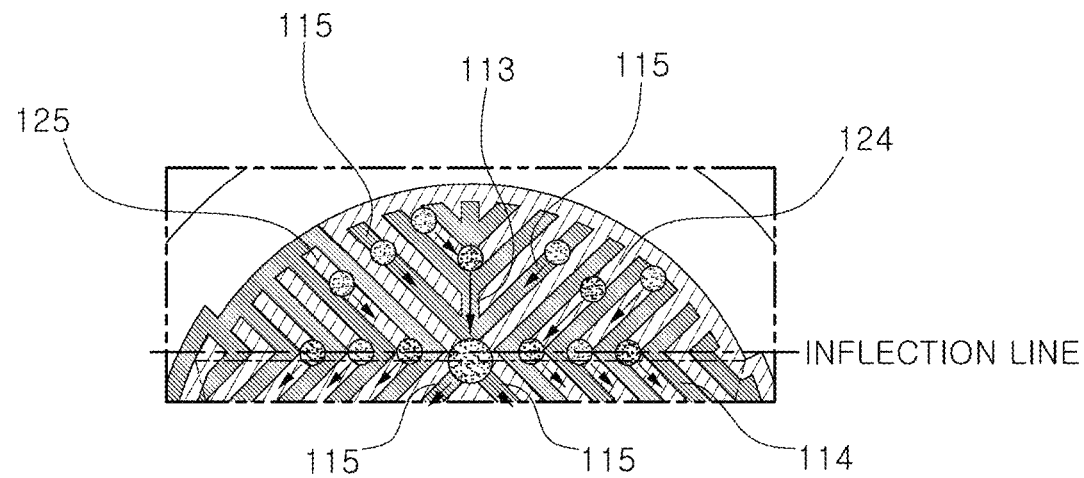
[FIG. 11]
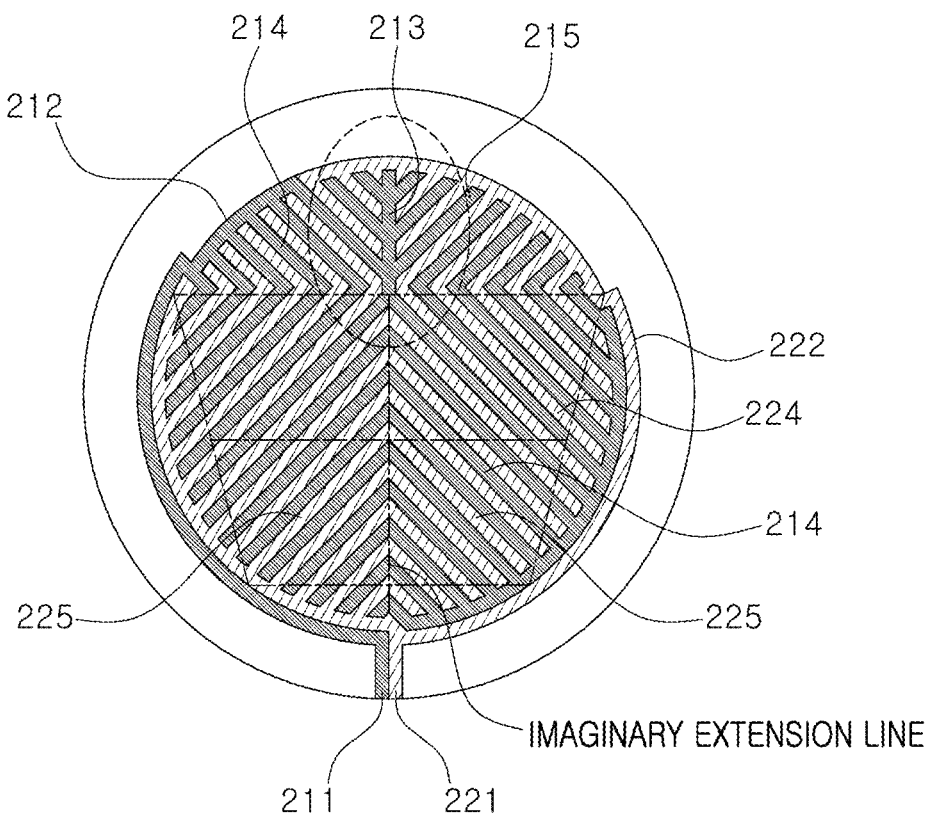

[FIG. 12]
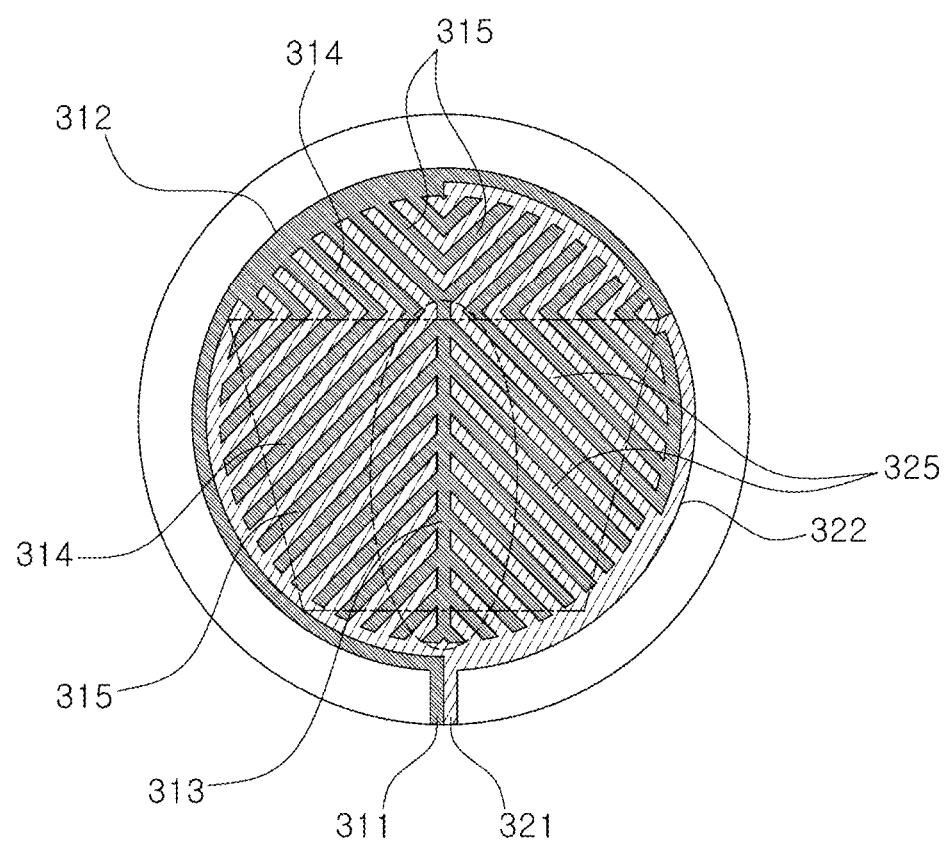

[FIG. 13]
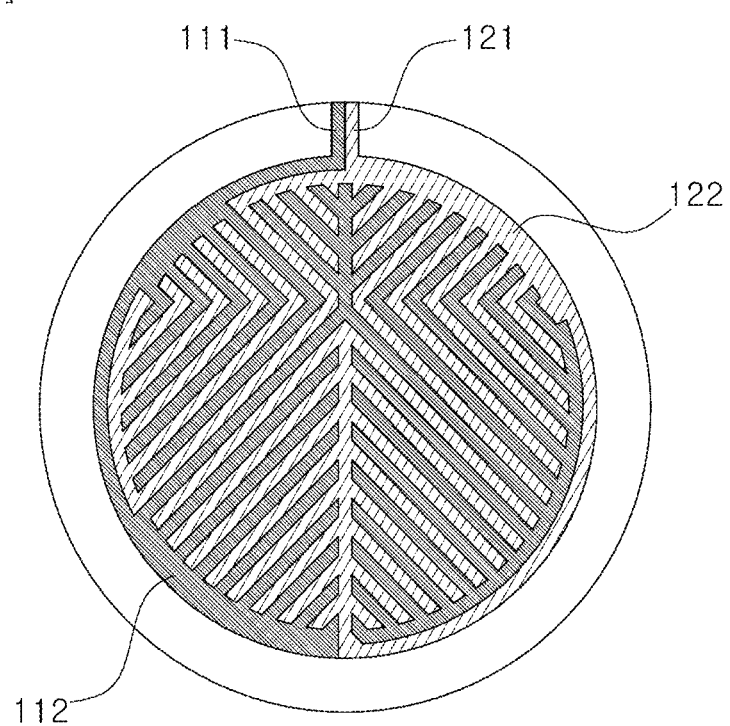

[FIG. 14]
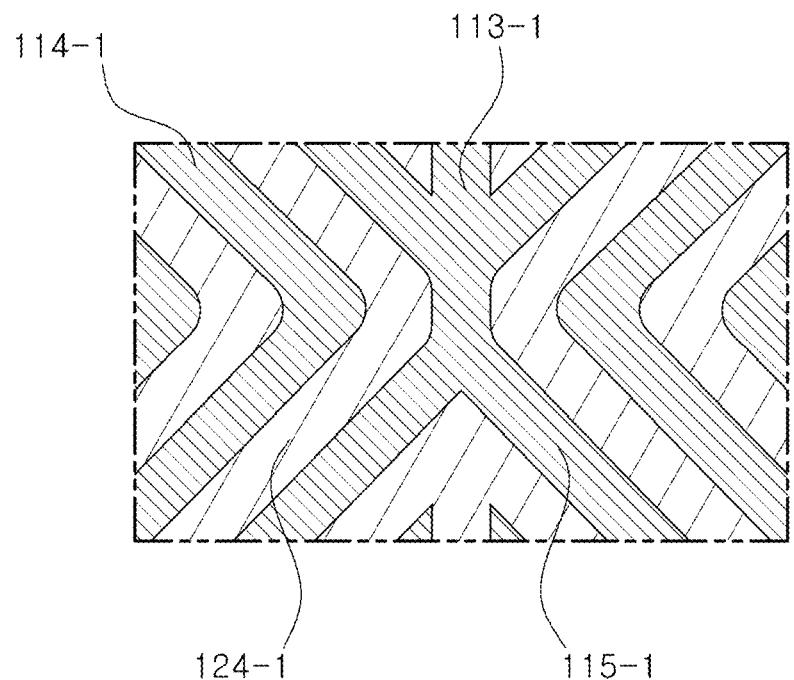
[FIG. 15]
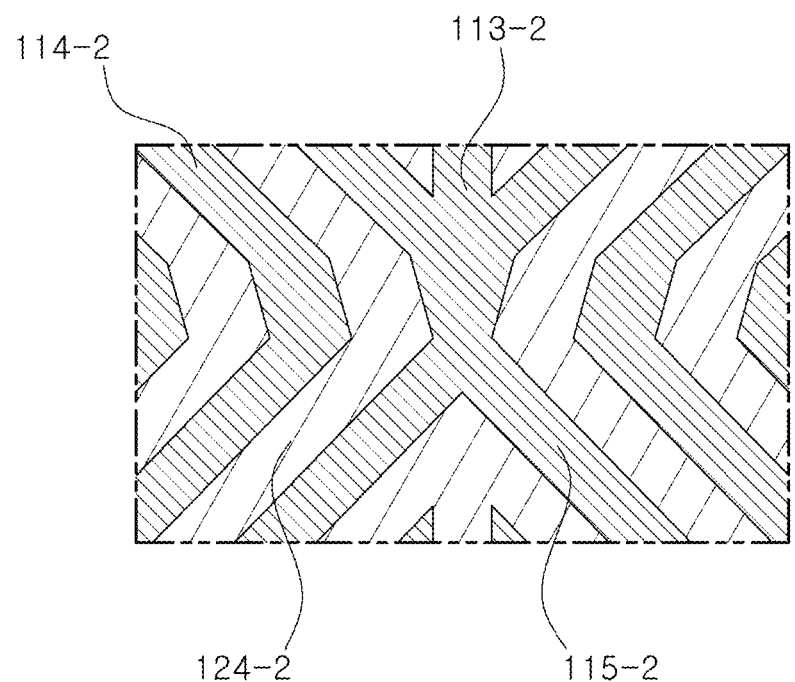

[FIG. 16]
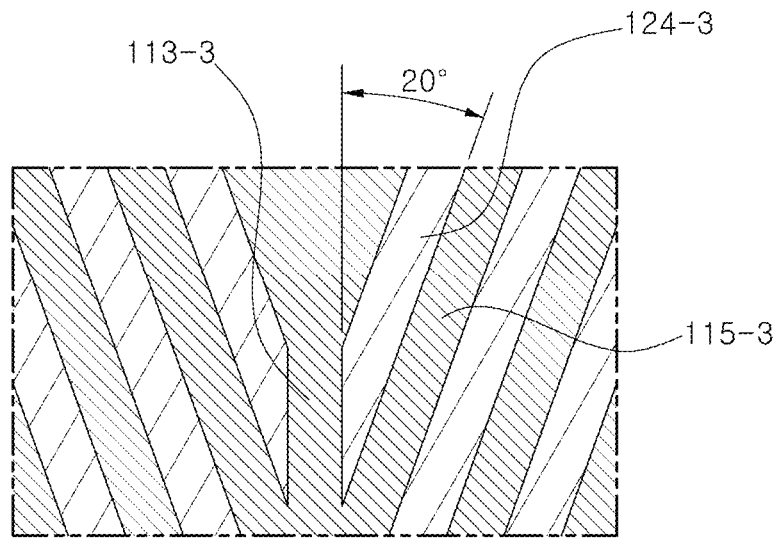
[FIG. 17]
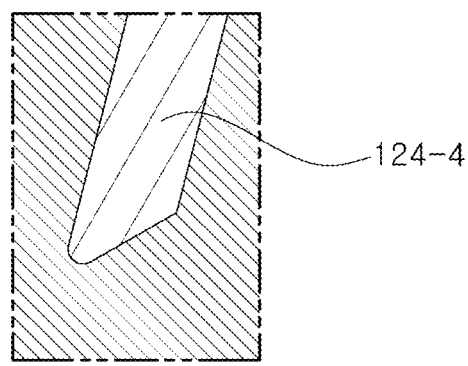
[FIG. 18]
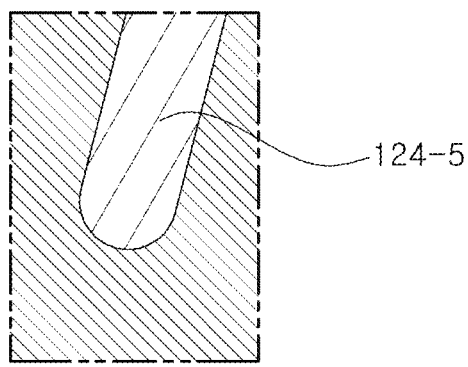

[FIG. 19]
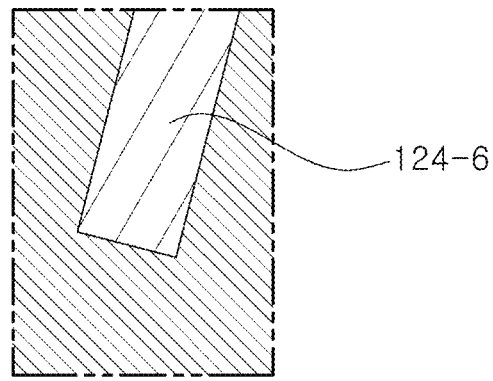
[FIG. 20]
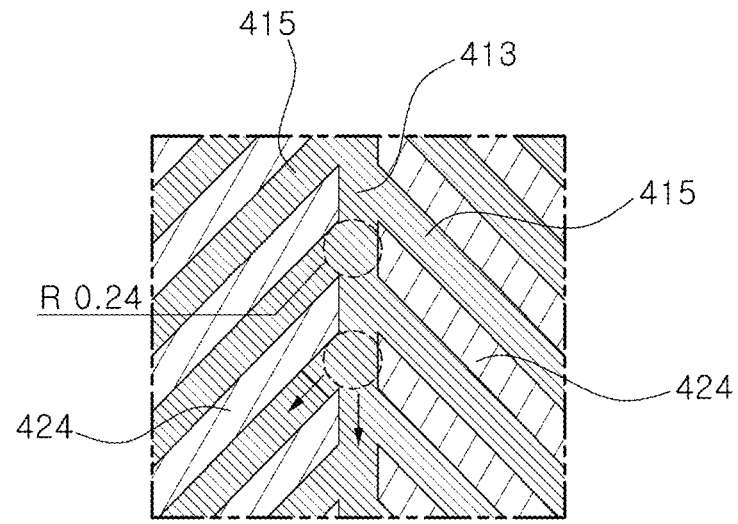

[FIG. 21]
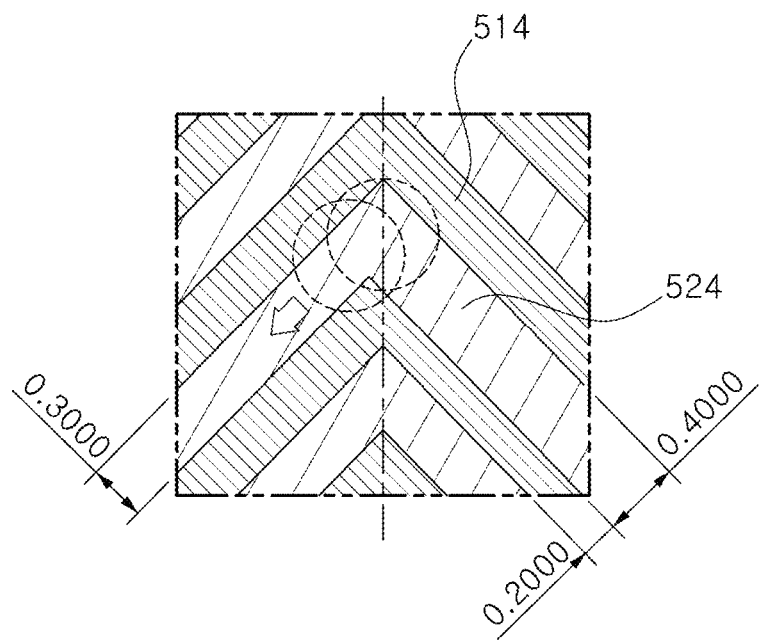

PATTERN ELECTRODE STRUCTURE FOR ELECTRO-WETTING DEVICE

CROSS-REFERENCE(S) TO RELATED APPLICATIONS

This application claims the benefit of priority to Korean Patent Application No. 10-2021-0171058, filed on Dec. 2, 2021 in the Korean Intellectual Property Office, which is incorporated herein by reference in its entirety.

TECHNICAL FIELD

Exemplary embodiments of the present disclosure relate to an electrode structure to which a pattern structure using an electro-wetting technology phenomenon is applied.

BACKGROUND

An electro-wetting phenomenon refers to a phenomenon of "change in contact angle between a solid and an electrolyte due to a difference in potential between the solid and the electrolyte."

When the phenomenon is used, since it is possible to control a surface tension of a droplet placed on an electrode coated with an insulator, deformation/movement of a microfluid of micro liters (μl) or less can be controlled.

In addition, since a separate external driving body is not required for driving, it is possible to reduce a weight of an applied product, a current flow is limited due to the insulator applied on the electrode, and thus power consumption is low and a response speed is fast, so that the electro-wetting phenomenon is getting great attention in various industries.

Examples of the use of electrowetting in various industries include a lab-on-a-chip, a fluid lens, and a display which are next-generation electronic devices different from the existing electronic devices.

In addition, since it is possible to move, deform, and remove droplets formed on a glass using the electro-wetting device, the electro-wetting device may be mounted on a windshield, a side mirror, and a camera of a vehicle to remove rainwater and dewdrops.

The present disclosure relates to a self-cleaning technology using the electro-wetting phenomenon.

An "electro-wetting self-cleaning device" has a structure and a function which are capable of periodically and repeatedly applying a direct current (DC) or an alternating current (AC) to a surface of a substrate.

When a "fluid drop (sessile drop) with polarity" is placed on a surface of the "electro-wetting self-cleaning device," the "fluid drop with polarity" may receive attraction and a repulsive force due to an electric field formed on the surface of the substrate.

Thus, when a voltage being applied is a DC voltage, the "fluid droplet with polarity" may be drawn in a direction of the electric field, and when the voltage being applied is an AC voltage, an oscillation may occur in the "fluid droplet with polarity" due to a periodic variation of the electric field.

The present disclosure is a method of generating an oscillation of the "fluid droplets with polarity" using the AC voltage and is a technique for inducing a falling by reducing a fixing force of a fluid droplet placed on a surface of the device.

That is, a force relationship before a voltage is applied (the fluid droplet adheres to the surface) is gravity=fixing force (friction force+viscous force+reaction force due to a contact angle hysteresis (CAH)), and after the voltage is applied (the fluid droplet starts sliding), the force relationship becomes gravity>fixing force (friction force+viscous force+reaction force due to the CAH↓) so that the fluid droplet falls.

Here, the CAH refers to a phenomenon in which a contact angle has a specific range due to a non-homogeneous surface of a solid or an external factor.

FIG. 1 illustrates a basic electro-wetting self-cleaning device in which an electrode layer 10, a dielectric layer 30, and a water repellent layer 40 are stacked on the glass 20 which is a base material.

The base material 20 is not limited to types of materials, and a transparent glass may be used for mounting on a product which transmits visible light, such as a camera.

The electrode layer 10 should be located below the dielectric layer 30 as a transparent electrode pattern layer, and the higher the electrical conductivity, the better the performance.

The electrode layer 10 is not necessarily transparent, and in order to be mounted on a product which transmits visible light, a transparent electrode should be used.

Representative materials include oxide-based indium tin oxide (ITO), polymer-based poly(3,4-ethylenedioxythiophene) polystyrene sulfonate (PEDOT:PSS), and oxide-polymer composite fluorine-doped tin oxide (FTO).

As the dielectric layer 30 has a high dielectric constant and a thin thickness, performance can be improved and a high dielectric breakdown strength is achieved, and as defects are decreased, durability and lifetime are improved. As the dielectric layer 30 becomes more uniform, more homogeneous, and more continuous, a deviation in performance and durability becomes low.

The dielectric layer 30 may be formed as a single layer or a multi-layer, and representative materials of the dielectric layer 30 include oxide/nitride-based materials such as $SiO_2$/$TiO_2$/$Al_2O_3$/$CeO_2$/$HfO_2$/$ZrO_2$/$ZnO$/$SiON$/$Si_3N_4$, and polymer-based materials such as Parylene-C, a cyclic olefin polymer (COP), and para-methoxy methamphetamine (PMMA). A deposition method includes a wet method (spray, spin-coating, and ink-jet) and a dry method (E-beam, sputtering, and chemical vapor deposition (CVD)).

The water repellent layer 40 is not an essential component and can be omitted when an outermost layer of the dielectric layer 30 has a sufficiently high contact angle.

A fluorine compound is used as a representative material of the water repellent layer 40 and coated using a method such as E-beam or spin coating.

When the electro-wetting device is driven (turned on) in a state in which a droplet D is in contact with the electro-wetting device as shown in FIG. 2, as shown in FIG. 3, the droplet D on a surface of the electro-wetting device immediately finds and moves to a position of electrical equilibrium, and thus a center of a closest electrode E generally is matched to a center of the droplet D.

However, when a size of a fluid droplet is smaller than or equal to a width of a currently positioned electrode, an electromagnetic force due to an adjacent electrode is weakened so that an oscillation may be weakened or absent.

Therefore, as in an example of FIG. 4, the electrode E should be designed to fit a target size of the fluid droplet, that is, the droplet D, to be removed, and the droplet D should have predetermined amounts of overlaps O extending to adjacent electrodes.

As a device for self-cleaning using the above principle, there is Korean Patent Laid-Open Application No. 10-2018-0045079.

This related art is a technique in which a pattern of an electrode is formed parallel to a direction of gravity so that a droplet easily falls in a direction of the electrode.

However, since it is difficult for a droplet having a small gravity due to a small mass to fall, there is a limit of self-cleaning on a small droplet. To this end, when a thickness of the electrode is increased, there is a limit in that efficiency is not good.

Computatively, it is difficult for the related art to induce a falling motion when a volume of a droplet ranges from 0.2 μl to 0.1 μl.

The contents described in the above Description of Related Art are to aid understanding of the background of the present disclosure and may include what is not previously known to those skilled in the art to which the present disclosure pertains.

SUMMARY

An embodiment of the present disclosure is directed to a pattern electrode structure for an electro-wetting device, which is capable of more efficiently exhibiting self-cleaning performance even on a small droplet.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided a pattern electrode structure for an electro-wetting device, which is stacked between a base material and a dielectric layer of the electro-wetting device, including a center branch electrode formed in a perpendicular direction with respect to an arbitrary plane perpendicular to a plane formed by the pattern electrode structure, and a plurality of sub-branch electrodes formed to extend from the center branch electrode in an inclined direction.

In addition, among the plurality of sub-branch electrodes, a sub-branch electrode from an upper end of the center branch electrode to a predetermined height may be formed to extend from the center branch electrode in an upward inclined direction.

In addition, the pattern electrode structure may further include a plurality of branch electrodes formed to be inclined in a direction parallel to the sub-branch electrode in a region where the sub-branch electrode is not formed from the upper end of the center branch electrode to a predetermined height.

In addition, the pattern electrode structure may further include a plurality of branch electrodes formed in a region where the center branch electrode is not formed at a position that is lower than the predetermined height, and the branch electrode may be symmetrically formed to be bent based on an imaginary extension line of the center branch electrode and may be inclined in a direction away from the imaginary extension line toward a lower end.

In addition, the pattern electrode structure may further include a plurality of branch electrodes formed in a region where the center branch electrode is not formed at a position that is lower than the predetermined height, the branch electrode may be formed to be bent based on an imaginary extension line of the center branch electrode and may be inclined in a direction away from the imaginary extension line toward a lower end, and bent portions of the plurality of branch electrodes may be disposed not to be formed on the same line.

In addition, among the plurality of sub-branch electrodes, a sub-branch electrode from a lower end of the center branch electrode to a predetermined height may be formed to extend from the center branch electrode in a downward inclined direction.

In addition, the pattern electrode structure may further include a branch electrode formed to be inclined in a direction parallel to the sub-branch electrode in a region where the sub-branch electrode is not formed from the lower end of the center branch electrode to a predetermined height.

In addition, the pattern electrode structure may further include a plurality of branch electrodes formed in a region where the center branch electrode is not formed at a position that is higher than the predetermined height, and the branch electrode may be symmetrically formed to be bent based on an imaginary extension line of the center branch electrode and may be inclined in a direction away from the imaginary extension line toward an upper end.

In addition, the plurality of sub-branch electrodes may be symmetrically formed based on the center branch electrode.

Alternatively, the plurality of sub-branch electrodes may be asymmetrically formed based on the center branch electrode.

In addition, an angle formed between the center branch electrode and the sub-branch electrode may be 45 degrees.

Meanwhile, the predetermined height, which is a criterion in which an inclination direction of the sub-branch electrode is different, may be closer to an upper end than a lower end of the center branch electrode.

In particular, when the electro-wetting device is a lens, the predetermined height, at which the inclination direction of the sub-branch electrode is different, may be set based on a region of interest (ROI).

In addition, a width of the center branch electrode in a region corresponding to the predetermined height may be greater than a width of the center branch electrode in the other region.

Next, in accordance with another embodiment of the present disclosure, there is provided a pattern electrode structure for an electro-wetting device, which is stacked between a base material and a dielectric layer of the electro-wetting device, including a first electrode and a second electrode, wherein the first electrode is formed in a perpendicular direction with respect to an arbitrary plane perpendicular to a plane formed by the pattern electrode structure and includes a first center branch electrode formed from an upper end of the pattern electrode structure to a predetermined height and a plurality of first sub-branch electrodes formed to extend from the first center branch electrode in an inclined direction, and the second electrode is formed in the perpendicular direction with respect to the arbitrary plane perpendicular to the plane formed by the pattern electrode structure and includes a second center branch electrode formed from a lower end of the pattern electrode structure to a predetermined height and a plurality of second sub-branch electrodes formed to extend from the first center branch electrode in an inclined direction.

In addition, the first sub-branch electrode may be formed to extend upward from the first center branch electrode in the inclined direction, and the second sub-branch electrode may be formed to extend upward from the second center branch electrode in the inclined direction.

In addition, the plurality of first sub-branch electrodes may be symmetrically formed based on the first center branch electrode, and the plurality of second sub-branch electrodes may be symmetrically formed based on the second center branch electrode.

In addition, a length of the second center branch electrode may be greater than a length of the first center branch electrode.

In addition, when the electro-wetting device is a lens, the second center branch electrode may be formed in a region of interest (ROI).

BRIEF DESCRIPTION OF THE DRAWINGS

FIG. 1 is a schematic diagram illustrating a basic electro-wetting device.

FIGS. 2 and 3 are diagram illustrating a droplet state before and after an electro-wetting device is driven.

FIG. 4 is a diagram illustrating a comparison of sizes of a droplet and an electrode.

FIG. 5 is a diagram illustrating a concept of a pattern electrode structure of the present disclosure.

FIG. 6 is a diagram illustrating a pattern electrode structure for an electro-wetting device according to a first embodiment of the present disclosure.

FIG. 7 is a diagram illustrating a portion marked with a scale of FIG. 6, and FIG. 8 is a diagram illustrating movement of a droplet in a structure of FIG. 7.

FIG. 9 is a diagram illustrating a movement state of a droplet in a region of interest (ROI) of FIG. 6.

FIG. 10 is a diagram illustrating a movement state of a droplet out of an ROI of FIG. 6.

FIG. 11 is a diagram illustrating a pattern electrode structure for an electro-wetting device according to a second embodiment of the present disclosure.

FIG. 12 is a diagram illustrating a pattern electrode structure for an electro-wetting device according to a third embodiment of the present disclosure.

FIG. 13 is a diagram illustrating a pattern electrode structure for an electro-wetting device according to a fourth embodiment of the present disclosure.

FIGS. 14, 15, 16, 17, 18, 19, 20 and 21 are diagrams illustrating specific application examples of the pattern electrode structure of the present disclosure.

DETAILED DESCRIPTION

In order to fully understand the present disclosure and operational advantages of the present disclosure and objects attained by practicing the present disclosure, reference should be made to the accompanying drawings that illustrate exemplary embodiments of the present disclosure and to the description in the accompanying drawings.

In describing exemplary embodiments of the present disclosure, known technologies or repeated descriptions may be reduced or omitted to avoid unnecessarily obscuring the gist of the present disclosure.

FIG. 5 is a diagram illustrating a concept of a pattern electrode structure of the present disclosure, and FIG. 6 is a diagram illustrating a pattern electrode structure for an electro-wetting device according to a first embodiment of the present disclosure.

In addition, FIG. 7 is a diagram illustrating a portion marked with a scale of FIG. 6, and FIG. 8 is a diagram illustrating movement of a droplet in a structure of FIG. 7.

Hereinafter, a pattern electrode structure for an electro-wetting device according to one embodiment of the present disclosure will be described with reference to FIGS. 5 to 8.

The present disclosure relates to a pattern electrode structure for an electro-wetting device, which increases a falling speed of a droplet having a small volume to improve cleaning efficiency and is a patterning technique for inducing a merging of droplets by controlling movement directions of relatively small droplets D1 and D2 as shown in FIG. 5.

Therefore, the merging droplet D has a mass and a volume which are greater than a mass and a volume of the existing droplet, and thus a falling motion may be more easily generated due to increased gravity.

As shown in the drawings, in the present disclosure, the electrode has a specific angle between zero degrees and 90 degrees based on a horizontal line and has a structure in which a plurality of upper electrodes are gathered and integrated into one lower electrode.

The pattern includes an electrode for receiving an externally applied voltage, a base electrode for delivering a voltage applied from the electrode, and a branch electrode which branches off from the base electrode and in which patterns having different polarities intersect to form an electric field, and the pattern will be described in more detail below.

A droplet on a surface of an electrode pattern moves in a length direction of the electrode pattern. In section A, a downward driving force is $\cos(90-\theta)$ times less than a downward driving force of a vertical pattern, whereas when reaching section B, droplets are merged, a mass is increased, gravity is increased, and the downward driving force is improved.

That is, a falling speed in section A is lower than a falling speed in section B, and as a magnitude of $\theta$ is decreased, a force in a sliding direction is largely increased.

In section B, two droplets are merged, and thus gravity is increased in addition to an increase in mass. A radius of the droplet is also increased, and thus a fixing force due to a viscous force, a friction force, and a contact angle hysteresis (CAH) is also slightly increased. However, since a value is small with respect to the gravity increased due to the changed radius, the downward driving force is increased.

Referring to FIGS. 6 and 7, the pattern electrode structure according to the first embodiment of the present disclosure has a pattern structure in which a multi-branch (Ψ) structure expanded from the Y-shaped pattern structure shown in FIG. 5 and a diagonal structure are combined.

The two base patterns have branches with various angles in a range of exceeding zero degrees and less than 90 degrees, and as the fluid droplets fall in a length direction of the branches, the fluid droplets absorb other fluid droplets in a falling path. Thus, a mass of the fluid droplet is increased, and gravity is increased due to the increased mass to allow the fluid droplet to be easily removed.

The pattern electrode structure includes a first electrode and a second electrode. The first electrode includes a first electrode connector 111, a first base pattern electrode 112, a first center branch electrode 113, a first branch electrode 114, and a first sub-branch electrode 115, and the second electrode includes a second electrode connector 121, a second base pattern electrode 122, a second center branch electrode 123, a second branch electrode 124, and a second sub-branch electrode 125.

As shown in the drawings, the pattern electrode structure having an entirely circular flat surface has been exemplified, when viewed in a plan view, an outer circumference shape may be applied as various shapes including a quadrangular shape and the like as long as it can include a characteristic of the branch electrode of the present disclosure.

In addition, since the pattern electrode structure of the present disclosure is for receiving an alternating-current (AC) voltage, vibrating droplets on the electrode to fall, thereby performing self-cleaning. A plane formed by an overall structure of the pattern electrode structure should be a plane perpendicular to a horizontal plane or a plane which is inclined at a predetermined angle.

Therefore, as shown in the drawings, it is possible to form an inclination of 90 degrees or less from the top to the bottom.

The first electrode connector 111 and the second electrode connector 121 are components for being connected to a power source so as to receive a voltage, and the first base pattern electrode 112 and the second base pattern electrode 122 are connected to the first electrode connector 111 and the second electrode connector 121, respectively, to form an outer circumference of an entirety of the pattern electrode structure. That is, the first electrode connector 111 forms a predetermined region of the outer circumference, and the second electrode connector 121 forms the remaining region of the outer circumference.

The first center branch electrode 113 and the second center branch electrode 123 are disposed in one direction on the electrode structure, and the one direction is formed in a perpendicular direction with respect to an arbitrary plane perpendicular to the electrode structure.

In addition, the first center branch electrode 113 and the second center branch electrode 123 are formed in a parallel direction coincident with one perpendicular line.

Meanwhile, a marked dashed-dotted line indicates a region of interest (ROI) of a camera when the electrowetting device of the present disclosure is a lens, and an inflection line shown in FIG. 10 is set based on the ROI, and the inflection line becomes a boundary between the first center branch electrode 113 and the second center branch electrode 123.

That is, the first center branch electrode 113 is formed from an upper end portion to the inflection line, and the second center branch electrode 123 is formed from a lower end portion to the inflection line.

Referring to the drawings, the first sub-branch electrode 115 is a plurality of pattern electrodes which are formed to extend upward from the first center branch electrode 113 to be inclined. The plurality of pattern electrodes are formed to be spaced apart from each other by a predetermined distance, and the second electrode, which will be described below, is formed in the gap space. Unlike the above embodiment, when the first center branch electrode 113 is formed below the inflection line, the first sub-branch electrode 115 may be formed to extend downward to be inclined.

In addition, at least one first sub-branch electrode 115 should be connected to the first base pattern electrode 112. Accordingly, the at least one first sub-branch electrode 115 may be formed to extend downward from the first center branch electrode 113 to be inclined. In addition, the first sub-branch electrode 115 may be symmetrically formed based on the first center branch electrode 113.

As shown in the drawings, an angle formed between the first sub-branch electrode 115 and the first center branch electrode 113 may be substantially 45 degrees. One or ordinary skill in the art would understand that the expression "substantially 45 degrees" may mean not only being exactly 45 degrees, but also being close to 45 degrees including process errors, positional deviations, and/or measurement errors that may occur in a manufacturing process, and the range thereof may be widely accepted in the art.

In addition, the first branch electrode 114 is classified as an electrode among first electrodes, excluding the first sub-branch electrode 115 disposed to be inclined based on a direction of the first center branch electrode 113.

The first branch electrode 114 in an upper region, which is a region outside the ROI based on the inflection line, has a structure in which a plurality of pattern electrodes formed to be inclined parallel to the first sub-branch electrode 115 are disposed to be spaced apart from each other by a predetermined distance. Such an inclined direction is formed such that a lower end is formed to be closer to the first center branch electrode 113 than an upper end based on the first branch electrode 114 in the inclined direction.

In addition, the first branch electrode 114 in the lower region including the ROI based on the inflection line has a structure in which a plurality of pattern electrodes, each of which the upper end is formed and inclined to be closer to the second center branch electrode 123 than the lower end, are spaced apart from each other by a predetermined distance.

In addition, the first branch electrode 114 may be symmetrically formed based on the first center branch electrode 113.

Therefore, as shown in the drawings, an electrode extending from the first base pattern electrode 112 and disposed to be inclined upward, an electrode extending from the first base pattern electrode 112 and disposed to be inclined downward, and an electrode bent from the electrode disposed to be inclined downward, an electrode disposed parallel to the first sub-branch electrode 115, and an electrode disposed to be bent from the electrode disposed parallel to the first sub-branch electrode 115 may be present. A structure is formed such that the plurality of first branch electrodes 114 are disposed to be spaced apart from each other by a predetermined distance.

Next, the second sub-branch electrode 215 is a plurality of pattern electrodes which are formed to extend downward from the second center branch electrode 213 to be inclined. The plurality of pattern electrodes are formed to be spaced apart from each other by a predetermined distance, and the first electrode, which is described above, is formed in the gap space.

In addition, in the first embodiment, the second sub-branch electrode 125 may be directly connected to the second electrode connector 121 or the second base pattern electrode 122. In contrast, as in the above-described first electrode, at least one second sub-branch electrode 125 may be formed to be inclined in a direction different from a direction of another sub-branch electrodes 125 to be connected to the second base pattern electrode 122.

In addition, the second sub-branch electrode 125 may be symmetrically formed based on the second center branch electrode 123.

As shown in the drawings, an angle formed between the second sub-branch electrode 125 and the second center branch electrode 123 may be substantially 45 degrees.

In addition, the second branch electrode 124 is classified as an electrode among second electrodes, excluding the second sub-branch electrode 125 disposed to be inclined with respect to a direction of the second center branch electrode 123.

The second branch electrode 124 in the lower region, which is a region including an inner region of the ROI based on the inflection line, has a structure in which a plurality of pattern electrodes formed to be inclined parallel to the second sub-branch electrode 125 are disposed to be spaced apart from each other by a predetermined distance. Such an inclined direction is formed such that an upper end is formed to be closer to the second center branch electrode 123 than a lower end based on the second branch electrode 124 in the inclined direction.

In addition, the second branch electrode 124 in the upper region based on the inflection line has a structure in which a plurality of pattern electrodes, each of which the lower end is formed and inclined to be closer to the first center branch electrode 113 than the upper end, are spaced apart from each other by a predetermined distance.

In addition, the second branch electrode 124 may be symmetrically formed based on the second center branch electrode 123.

Therefore, as shown in the drawings, an electrode extending from the second base pattern electrode 122 and disposed to be inclined downward, an electrode extending from the second base pattern electrode 122 and disposed to be inclined downward, and an electrode bent from the electrode disposed to be inclined downward, an electrode disposed parallel to the second sub-branch electrode 125, and an electrode bent to extend from the electrode disposed parallel to the second sub-branch electrode 125 may be present. A structure is formed such that the plurality of second branch electrodes 124 are disposed to be spaced apart from each other by a predetermined distance.

According to the pattern electrode structure of the present disclosure, which is configured as described above, as shown in FIG. 8, the droplets D1 and D2 falling in a downward direction inclined along the second sub-branch electrode 125 are merged at the first center branch electrode 113 and thus a volume is increased, and from a point of time when passing through the inflection line, the merged droplet D easily falls along the second sub-branch electrode 125 and the second center branch electrode 123 again.

Looking at an inside of the ROI in detail with reference to FIG. 9, when the fluid droplet is located in the first branch electrode 114 or the second branch electrode 124 and has a size enough to overlap adjacent electrodes, the fluid droplet has a sufficient oscillation and a sufficient downward driving force necessary for falling to slide in the length direction of the electrode.

When the size of the fluid droplet is small and thus the fluid droplet does not come into contact with the adjacent electrodes, the fluid droplet may be fixed on a surface but may be merged with other fluid droplets, which slide around the fluid droplet, to slide together with the other fluid droplets.

Since the length of the electrode is long, the fluid droplet sliding from the top is increased as falling down to have a greater downward driving force.

When the fluid droplet is located near the second center branch pattern electrode 123, the fluid droplet stochastically falls along one of a vertical pattern or a left and right oblique pattern due to an influence of an initial position/electrical equilibrium of the fluid droplet.

Looking at an outside of the ROI with reference to FIG. 10, when the fluid droplet is located in the first branch electrode 114 or the second branch electrode 124 and has a size enough to overlap adjacent electrodes, the fluid droplet has a sufficient oscillation and a sufficient downward driving force necessary for falling to slide in the length direction of the electrode.

When the size of the fluid droplet is small and thus the fluid droplet does not come into contact with the adjacent electrodes, the fluid droplet may be fixed on a surface but may be merged with other fluid droplets, which slide around the fluid droplet, to slide together with the other fluid droplets.

Even when the fluid droplet does not slide, since the fluid droplet is present out of the ROI of the camera, cleaning performance of the camera is not affected.

When the fluid droplet is located around the first center branch electrode 113, the fluid droplet falls vertically.

When the fluid droplets reach the inflection line in which a direction of sliding is changed, a delay may occur temporarily. The fluid droplets may be merged with following sliding fluid droplet due to the delay to have a greater downward driving force due to an increase in mass.

Next, FIG. 11 is a diagram illustrating a pattern electrode structure for an electro-wetting device according to a second embodiment of the present disclosure, and FIG. 12 is a diagram illustrating a pattern electrode structure for an electro-wetting device according to a third embodiment of the present disclosure.

The pattern electrode structure for an electro-wetting device according to the second embodiment also includes a first electrode and a second electrode. The first electrode includes a first electrode connector 211, a first base pattern electrode 212, a first center branch electrode 213, a first branch electrode 214, and a first sub-branch electrode 215, and the second electrode includes a second electrode connector 221, a second base pattern electrode 222, a second branch electrode 224, and a second sub-branch electrode 225.

That is, the first center branch electrode 213 is formed only outside an ROI above an inflection line, and the second center branch electrode 224 is omitted inside the ROI above the inflection line.

Accordingly, second sub-branch electrodes 225 are connected to each other without being connected to the second center branch electrode 224.

As described above, when the center branch pattern is omitted in the ROI, the fluid droplet falls along the second sub-branch electrode 225.

The pattern electrode structure for an electro-wetting device according to the third embodiment also includes a first electrode and a second electrode. The first electrode includes a first electrode connector 311, a first base pattern electrode 312, a first branch electrode 314, and a first sub-branch electrode 315, and the second electrode includes a second electrode connector 321, a second base pattern electrode 322, a second branch electrode 324, and a second sub-branch electrode 325.

That is, the second center branch electrode 323 is formed only inside an ROI below an inflection line, and a first center branch electrode is omitted inside the ROI above the inflection line.

Accordingly, first sub-branch electrodes 315 are connected to each other without being connected to the first center branch electrode.

As described above, when a center branch pattern is omitted outside the ROI, it is possible to design such that a fluid droplet of a specific size or less is trapped so as not to flow into the ROI.

When the center branch pattern is applied, the falling at a position where the fluid droplets gather may be made easier, but as in the second and third embodiments, it may be selectively applied according to the purpose.

FIG. 13 is a diagram illustrating a pattern electrode structure for an electro-wetting device according to a fourth embodiment of the present disclosure. Unlike the first embodiment, only positions of a first electrode connector 111 and a second electrode connector 121 are changed to an upper end portion.

As described above, the positions of the electrode connectors may be set differently for each embodiment.

Next, FIGS. 14 to 21 are diagrams illustrating specific application examples of the pattern electrode structure of the present disclosure.

As shown in FIG. 7, in the pattern electrode structure according to the first embodiment of the present disclosure, a bent portion bent from the center branch electrode to the sub-branch electrode and a bent portion of the branch electrode have a so-called angled side structure. As shown in FIG. 14, a bent portion bent from a first center branch electrode 113-1 to a first sub-branch electrode 115-1, and bent portions of a first branch electrode 114-1 and a second branch electrode 124-1 may each have a round shape.

Alternatively, as shown in FIG. 15, the pattern electrode structure has a structure in which a width of an inflection region, which is an end of a first center branch electrode 113-2, is expanded. Thus, a shape of a bent portion bent to a first sub-branch electrode 115-2, and shapes of bent portions of a first branch electrode 114-2 and a second branch electrode 124-2 may be changed.

In order to intentionally delay the sliding of the fluid droplet, the bent portion may be in the form of a bent side shape as shown in FIG. 7, and in order to facilitate a flow of the fluid droplet, the bent portion may be in the form of a round shape as shown in FIG. 14, and in order to trap the fluid droplet in the inflection line, an area of the bent portion may be significantly expanded as shown in FIG. 15.

As the area of the bent portion is increased, the fluid droplets not overlapping adjacent electrodes stop and standby, and when an additional fluid flows and thus the fluid droplets are increased enough to overlap the adjacent electrodes, the fluid droplets may start to fall again.

Since the inflection line is a region which artificially induces the merging of fluids, it is prioritized to locate the inflection line outside the ROI. However, a position of the inflection line may be adjusted according to the intent of design.

Meanwhile, in the embodiment of FIG. 7, the angle formed between the first sub-branch electrode 115 and the first center branch electrode 113 is substantially 45 degrees, whereas, as shown in FIG. 16, an angle formed between a first sub-branch electrode 115-3 and a first center branch electrode 113-3 may be set to 20 degrees. That is, according to the intent of design, the first or second branch pattern and the sub-branch pattern may have various angles in a range of exceeding zero degrees and less than 90 degrees.

Unlike in the above embodiments, FIGS. 17 to 19 illustrate end shapes of first center branch electrodes 124-4, 124-5, and 124-6.

As described above, the end shapes of the first branch electrode, the second branch electrode, the first sub-branch electrode, and the second sub-branch electrode may have various shapes according to the intent of design.

Next, referring to FIG. 20, unlike in the above embodiments, first sub-branch electrodes 415 may be asymmetrically formed based on a first center branch electrode 413, and a second branch electrode 424 formed in a gap space between the first sub-branch electrodes 415 may also be asymmetrically formed.

As described above, the first or second branch pattern and the sub-branch pattern may be symmetrical or asymmetrical, and when the fluid droplet is seated on a surface of the device, a size of the fluid droplet which is initially drivable is determined.

Generally, in the case of asymmetry, since a space of the pattern having the same polarity may be formed to be smaller, smaller droplets may be initially driven.

For example, in the case of symmetry as in the above embodiments, when a radius of an empty space is R=0.32 mm, a probability of surface adhesion of a fluid droplet having a radius of 0.32 mm or less is increased, and when a radius of the empty space is R=0.24 mm as shown in FIG. 20, a probability of surface adhesion of a fluid droplet having a radius of 0.24 mm or less is increased.

When the structure is symmetrical and the fluid droplet is located around a center line, the fluid droplet starts to fall in a random direction among three vertical/left/right directions from an initial position, whereas, when the structure is asymmetric, the falling direction may be controlled using the asymmetric shape.

Next, FIG. 21 illustrates that bent portions of a first branch electrode 514 and a second branch electrode 524 are displaced to be offset from each other on a horizontal axis.

In this case, as shown in the drawing, the first branch electrode 514 and the second branch electrode 524 are formed to have different thicknesses based on the bent portions.

As described above, an asymmetric structure in which widths/distances/shapes of left and right patterns are differentiated based on a central axis of the first or second branch pattern and the sub-branch pattern in the ROI is formed, and thus when the fluid droplet falls, sliding may be induced in an intended direction.

Since the fluid droplet having polarity finds an electrical equilibrium position to move instantaneously before sliding occurs when an initial voltage is applied, the fluid droplet may be more biased in a specific direction through a minor change in the shapes of the left and right electrodes, and thus the sliding direction may be determined.

When an electro-wetting device of the present disclosure is driven, it is possible to improve a phenomenon in which fluid droplets, each having a specific size (or volume) or less, are not removed and adhered on a surface.

In addition, an additional sub-branch pattern is added to the existing branch pattern so that a sliding direction of the fluid droplet can be induced, and the induced fluid droplets can be merged to form a fluid droplet having a large mass and a large volume.

In addition, the fluid droplets having the increased mass and the increased volume have stronger oscillation and downward driving forces by an electro-wetting self-cleaning device so that cleaning performance can be improved.

This technology is particularly useful for applications in which small water droplets occupy a large area in an image of a rear view camera or a surround view monitoring (SVM) camera and is effective in solving an error of the recognition sensor due to rainwater/contamination. (Recognition of pedestrians, signs, vehicles, and the like)

While the present disclosure has been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed based on the appended claims.

What is claimed is:

1. A pattern electrode structure for an electro-wetting device, which is stacked between a base material and a dielectric layer of the electro-wetting device, the pattern electrode structure comprising:
   a first electrode; and
   a second electrode,
   wherein the first electrode includes a first center branch electrode extending, in a first direction, from an upper end of the pattern electrode structure to a predetermined height and a plurality of first sub-branch electrodes extending from the first center branch electrode in an inclined direction relative to the first direction,
   wherein the second electrode includes a second center branch electrode extending, in the first direction, from a lower end of the pattern electrode structure to a predetermined height and a plurality of second sub-branch electrodes extending from the second center branch electrode in an inclined direction relative to the first direction, and
   wherein a polarity of the first center branch electrode and a polarity of the second center branch electrode are different.

2. The pattern electrode structure of claim 1, wherein the plurality of first sub-branch electrodes are symmetrically formed based on the first center branch electrode, and
   the plurality of second sub-branch electrodes are symmetrically formed based on the second center branch electrode.

3. The pattern electrode structure of claim 2,
   wherein the first electrode further includes a plurality of first branch electrodes extending in an inclined direction parallel to the first sub-branch electrodes in a region where the first sub-branch electrodes are not formed.

4. The pattern electrode structure of claim 2,
   wherein the second electrode further includes a plurality of second branch electrodes extending in an inclined direction parallel to the second sub-branch electrodes in a region where the second sub-branch electrodes are not formed.

5. The pattern electrode structure of claim 2, wherein, among the plurality of first sub-branch electrodes, a sub-branch electrode disposed in a region from a lower end of the first center branch electrode to a predetermined height extends from the first center branch electrode in a downward inclined direction.

6. The pattern electrode structure of claim 5,
   wherein the first electrode further includes a first branch electrode extending, from a lower end of the first center branch electrode to a predetermined height, in an inclined direction parallel to the first sub-branch electrodes in a region where the sub-branch electrodes are not formed.

7. The pattern electrode structure of claim 6,
   wherein the second electrode further includes a second branch electrode extending, from an upper end of the second center branch electrode to a predetermined height, in an inclined direction parallel to the second sub-branch electrodes in a region where the second sub-branch electrodes are not formed.

8. The pattern electrode structure of claim 1, wherein the plurality of first sub-branch electrodes are asymmetrically formed based on the first center branch electrode, and
   the plurality of second sub-branch electrodes are asymmetrically formed based on the second center branch electrode.

9. The pattern electrode structure of claim 5, wherein an angle formed between the first center branch electrode and each of the plurality of first sub-branch electrodes is substantially 45 degrees, and
   an angle formed between the second center branch electrode and each of the plurality of second sub-branch electrodes is substantially 45 degrees.

10. The pattern electrode structure of claim 5, wherein a length of the second center branch electrode is greater than a length of the first center branch electrode.

11. The pattern electrode structure of claim 10, wherein, when the electro-wetting device is a lens, the predetermined height, at which the first center branch electrode and the second branch electrode meet, is set based on a region of interest (ROI).

12. The pattern electrode structure of claim 10, wherein a width of the first center branch electrode in a region corresponding to the predetermined height is greater than a width of the first center branch electrode in the other region.

* * * * *